US009294923B2

United States Patent
Meacham et al.

(10) Patent No.: US 9,294,923 B2
(45) Date of Patent: Mar. 22, 2016

(54) DETECTION OF POTENTIALLY FRAUDULENT ACTIVITY BY USERS OF MOBILE COMMUNICATIONS NETWORKS

(75) Inventors: Matthew John Meacham, Godalming (GB); Richard Thomas Jarvis, Hambrook (GB)

(73) Assignee: BAE SYSTEMS plc, London (GB)

(*) Notice: Subject to any disclaimer, the term of this patent is extended or adjusted under 35 U.S.C. 154(b) by 3 days.

(21) Appl. No.: 14/342,052

(22) PCT Filed: Aug. 30, 2012

(86) PCT No.: PCT/GB2012/052125
§ 371 (c)(1),
(2), (4) Date: Aug. 22, 2014

(87) PCT Pub. No.: WO2013/030574
PCT Pub. Date: Mar. 7, 2013

(65) Prior Publication Data
US 2014/0370850 A1     Dec. 18, 2014

(30) Foreign Application Priority Data
Aug. 31, 2011 (GB) .................................. 1115007.5

(51) Int. Cl.
H04W 12/02 (2009.01)
H04W 12/12 (2009.01)
H04L 29/06 (2006.01)

(52) U.S. Cl.
CPC ........... *H04W 12/12* (2013.01); *H04L 63/1416* (2013.01); *H04W 12/02* (2013.01)

(58) Field of Classification Search
CPC ....... H04W 12/12; G06F 21/26; G06F 21/566

USPC ........... 455/410, 466; 726/22, 23, 24, 25, 26, 726/32
See application file for complete search history.

(56) References Cited

U.S. PATENT DOCUMENTS 6,327,352 B1 * 12/2001 Betts et al. ..................... 379/189
6,914,968 B1 *  7/2005 Ryley et al. .................... 379/188

(Continued)

FOREIGN PATENT DOCUMENTS

GB          2 421 142 A      6/2006

OTHER PUBLICATIONS

International Preliminary Report on Patentability and Written Opinion dated Mar. 13, 2014.
Ricciato, F. et al., "Traffic monitoring and analysis in 3G networks: lessons learned from the METAWIN project", Elektrotechnik & Informationstechnik (Aug. 1, 2006), vol. 123, No. 7-8, pp. 288-296.
International Search Report and Written Opinion dated Dec. 3, 2012 issued in PCT/GB2012/052125.

*Primary Examiner* — Siu Lee
(74) *Attorney, Agent, or Firm* — Scully, Scott, Murphy & Presser, PC

(57) ABSTRACT

A mobile communications fraud detection system is provided in which one or more probe devices are deployed to intercept predetermined types of data being carried over selected interfaces within the mobile communications network. In particular, the probe devices are arranged to intercept data being carried between equipment responsible for providing the air interface to mobile communications devices using the network and equipment interfacing with the mobile network's core switching equipment. Fraudulent activity relating to gateway fraud, revenue sharing fraud, credit or debit card fraud, spam generation and fraudulent or other activity indicative of the presence of malware executing on a mobile communications device.

14 Claims, 1 Drawing Sheet

(56) References Cited

U.S. PATENT DOCUMENTS

| | | | |
|---|---|---|---|
| 7,512,221 B2 * | 3/2009 | Toms | 379/114.14 |
| 8,615,217 B2 * | 12/2013 | Ravishankar et al. | 455/410 |
| 2006/0128406 A1 * | 6/2006 | Macartney | 455/466 |
| 2009/0252159 A1 * | 10/2009 | Lawson et al. | 370/352 |

* cited by examiner

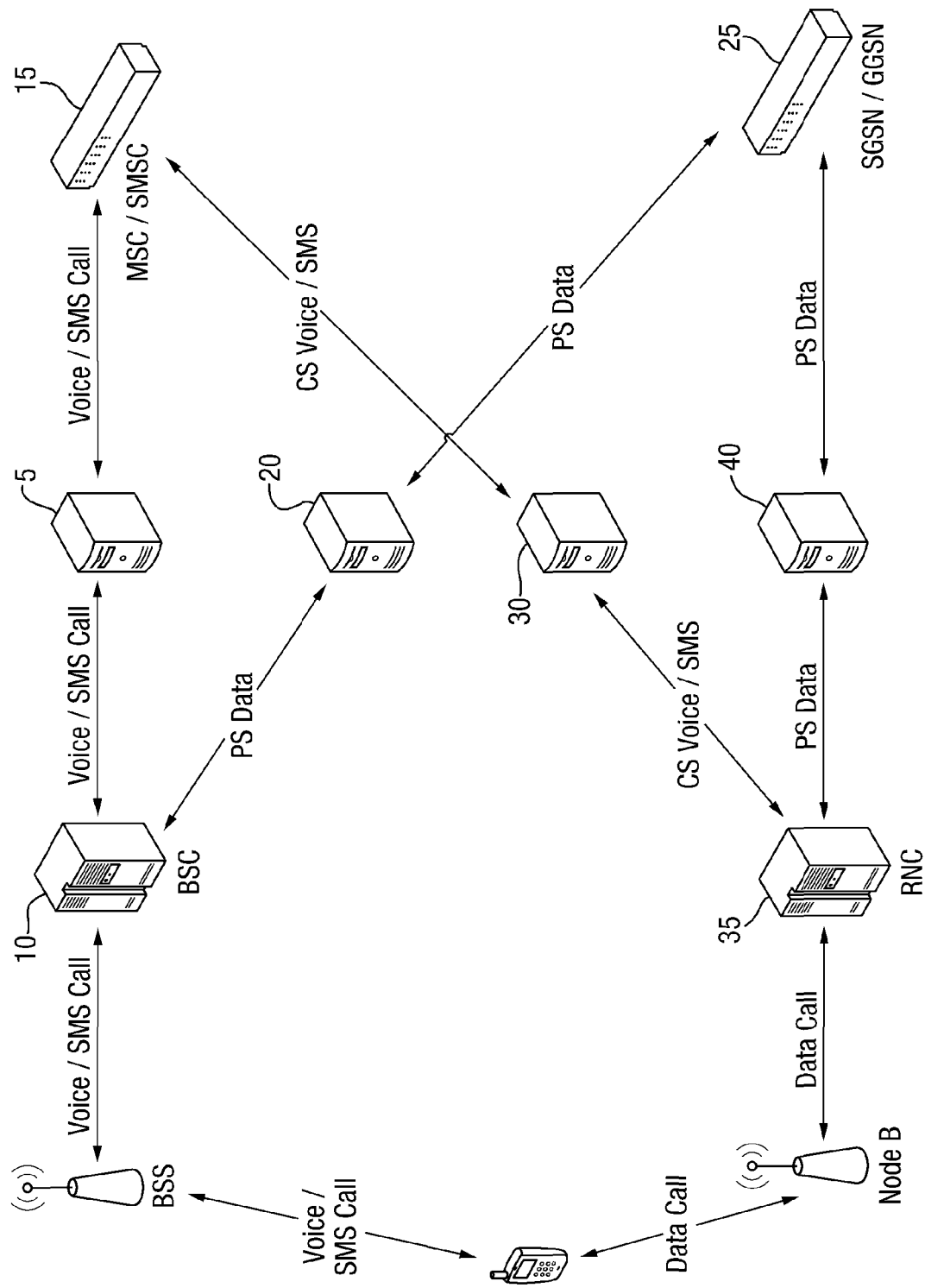

DETECTION OF POTENTIALLY FRAUDULENT ACTIVITY BY USERS OF MOBILE COMMUNICATIONS NETWORKS

This invention relates to activity detection in mobile telephony networks. In particular, but not exclusively, this invention is directed to the detection of predetermined types of activity by users of a mobile telephony network, in particular, activities indicative of fraudulent behaviour, substantially at the time that those activities occur.

Currently known techniques for identifying fraudulent activity by mobile network users include the detection of events derived through analysis of data generated by network operators for billing purposes. These billing data are generated at the end of an event, for example upon completion of a telephony or data call, making it impossible to identify fraudulent behaviour until after the communication has completed. By such time, losses may already have been sustained and the opportunity to intervene will have passed.

According to the present invention there is provided a mobile communications fraud detection system, comprising one or more probe devices arranged to intercept data of a plurality of predetermined types being carried over interfaces between equipment in a mobile communications network providing an air interface with subscriber mobile communications devices and equipment interfacing with core switching equipment of the mobile network, and a processor arranged to receive predetermined types of data intercepted by the plurality of probe devices and to determine the presence of at least one predetermined type of fraudulent activity by users of the mobile network substantially at the time it occurs.

To enable such activity to be detected, the plurality of probe devices are arranged to intercept data types indicative of one or more of:
  (i) originating user's address or identity;
  (ii) destination address or identity;
  (iii) originating user's mobile equipment identity; and
  (iv) originating user's cell identity.

However, in support of certain types of fraud, the plurality of probe devices are arranged to extract content of text messages or content of data sessions being communicated from or to a user of the mobile network, or to extract dual-tone multi-frequency signalling tones being communicated from or to a user of the mobile network.

In a preferred embodiment, the processor is arranged with access to data indicative of destination identities potentially associated with fraudulent activity. Such data may be held typically in an external database to which the processor may be linked.

Preferably, the processor is arranged with access to records of previous call activity by subscribers of the mobile network. Records of such activity may have been accumulated by the fraud probe of the present invention, or they may be available from other sources, such as call records stored within the mobile network or by the network operator.

In a preferred embodiment, the fraud detection system is arranged to detect, from an analysis of the intercepted data of a plurality of predetermined types, one or more types of potentially fraudulent activity selected from gateway fraud, revenue share fraud, credit or debit card fraud, spam generation and fraudulent or other activities indicative of the presence of malware executing on a mobile communications device.

In order to comply with data protection legislation or to follow best practice, the one or more probe devices are arranged to carry out pre-processing of the intercepted data to anonimise or to encrypt certain predetermined types of sensitive data prior to communication outside of the probe device. If required, the one or more probe devices are arranged to determine the presence of at least one predetermined type of fraudulent activity by users of the mobile network substantially at the time it occurs and to trigger a response to a determined presence of such activity without making the predetermined types of sensitive data generally available outside of the probe device. Such functionality may be implemented without necessarily involving the processor in the detection of such activity.

In a preferred implementation, the mobile communications network is one which uses internet protocol (IP)-based transport for its signalling. In particular the mobile communications network is a General Packet Radio Service (GPRS) network. In such a network the one or more probe devices are arranged to intercept data of the plurality of predetermined types being carried over interfaces selected from at least one of the A-interface, the Gb-interface, the Iu-CS interface and the Iu-PS interface in the GPRS network. Such data types may comprise at least one of:
  called number;
  originating user's International Mobile Subscriber Identifier (IMSI);
  originating user's Mobile Subscriber Integrated Digital Services Network Number (MSISDN);
  destination MSISDN;
  originating user's International Mobile Equipment Identifier (IMEI);
  cell identifier (Cell ID);
  originating address; and
  destination address.

Preferred embodiments of the present invention will now be described in more detail, by way of example only, with reference to the accompanying drawing—FIG. 1—showing the location of probe devices in a GPRS mobile telecommunications network in a preferred application of the present invention.

Preferred embodiments of the present invention will be described in the particular context of a General Packet Radio Service (GPRS) mobile telecommunications network comprising a combination of packet switching (for data calls) and circuit switching (for voice calls) nodes, the latter corresponding to the Global System for Mobile (GSM) standards and conventions. However, it will be apparent to a person or ordinary skill in the relevant field that equivalent functionality may be deployed in mobile communications networks whose architectures comply with other mobile communications network standards and conventions, for example those of the Universal Mobile Telecommunications System (UMTS), also a GSM-based network architecture, Long Term Evolution (4G LTE) or a network architecture based upon one of the competing Code Division Multiple Access (CDMA) mobile telecommunications standards—cdmaOne (IS-95) or CDMA2000 (IS-2000).

In the present invention the disadvantages of after-the-event fraud detection may be overcome by looking for activities indicative of fraud while they are in progress, so providing an opportunity for the activity to be stopped or blocked before losses occur. Such activities are detected through an analysis of data captured at certain key points within the architecture of a mobile telephony network. Capture of the required data may be achieved using network probes and other monitoring devices, subject to appropriate conditions being satisfied relating to data interception and the types of data intercepted, enabled by the use of approved architectures for the probes and for the methods by which intercepted data and the results of preferred analyses are stored and processed.

A preferred implementation of the present invention will now be described with reference to FIG. 1 in which a portion of a GPRS mobile communications network is shown to illustrate a preferred deployment of passive probes of the present invention that enable the detection fraudulent activity.

Referring to FIG. 1, a preferred monitoring system to enable access to the data types outlined above comprises the deployment of monitoring devices and network taps, preferably passive IP probe devices connected to access data over each of the following interfaces of a GPRS network:

a) a first IP probe 5 at the A-interface between a Base Station Controller (BSC) 10 and a Mobile Switching Centre (MSC) 15;

b) a second IP probe 20 at the Gb-interface between a Base Station Controller (BSC) 10 and a Serving GPRS Support Node (SGSN) 25;

c) a third IP probe 30 at the Iu-CS interface between a Radio Network Controller (RNC) 35 and a Mobile Switching Centre (MSC) 15; and d) a fourth IP probe 40 at the Iu-PS interface between a Radio Network Controller (RNC) 35 and a Serving GPRS Support Node (SGSN) 25.

All of these preferred probe placements have in common the objective of capturing data at points within the network between those devices that provide the air interface with mobile communications devices and those devices that form the entry point to the mobile operator's core switching network, whether handling voice calls or data sessions.

Data captured by each of the IP probes 5, 20, 30, 40, may be subject to initial processing to generate reports of certain predetermined events or to stream predetermined combinations of monitored data which may be routed to a processing device (not shown in FIG. 1) arranged to analyse the reported or streamed data according to the type of fraud to be detected. By intercepting data of the types identified in detail below, within packet-switched data or circuit-switched voice or SMS messages passing over each of the above-referenced interfaces, a number of different network usage activities may be identified and compared with predetermined models of behaviour that have been established as indicative of fraud.

The probe devices 5, 20, 30, 40 may be arranged to preprocess intercepted data in such a way as to comply with data protection legislation in force at the time to ensure that certain types of data are not available outside of the probe device, for example over a user interface. If necessary, the detection of certain types of fraudulent activity may be implemented entirely within the probe device and any reports of the presence of such activity may be suitably anonimised or otherwise secured to the extent required to trigger an alarm and, for example, to trigger an automated response without revealing details likely to identify a subscriber to the network. However, such details as would be necessary to support a legal enforcement process may be retained securely within the probe device so that they may be revealed by order of a court or to those in authority.

A particular advantage with preferred embodiments of the present invention is that all such potentially fraudulent activities may be identified while they are in progress. Conventional after-the-event fraud detection relies upon call records or billing data generated following call or session completion, such data typically only becoming available in a bulk download process operating once or twice per day.

In the following, known types of fraudulent activity are summarised and, for each, an outline description is provided on how the present invention is able to detect that particular fraudulent activity taking place, including details of the corresponding types of signalling data and/or message content that would be captured by the network probes 5, 20, 30, 40 of the present invention in order to detect such activity:

1) Gateway Fraud

This type of fraud arises when a fraudster obtains Subscriber Identity Modules (SIMs) fraudulently or uses them in a fraudulent manner to enable calls to be routed across a particular telephony carrier's network.

Gateway fraud may be detected through access to Called Numbers and at least one of the respective originating user's International Mobile Subscriber Identifier (IMSI), International Mobile Equipment Identifier (IMEI) and Cell Identifier (Cell ID).

In a preferred embodiment, the processing device may receive the above parameters, captured by the IP probes 5, 20, 30, 40 over respective interfaces, and use them to identify gateway fraud in several ways:

By correlating abnormally large call volumes to foreign destinations or other higher cost numbers, such as premium-rate numbers, from a particular Cell ID, IMEI or IMSI, abnormal activity being identified with reference to monitored activity over a period of time, or with reference to historic call records for a respective mobile subscriber, it is possible to identify the existence of a Gateway.

By identifying IMSIs that make many (a configurable value) calls to a suspected gateway destination country where the individual destination addresses are mainly unique.

By identifying IMSIs that make calls to a suspected gateway destination country within a short period of time of the respective subscriber being activated on the network, or of a call credit level being "topped up" in the case of a "pay-as-you-go" subscriber—determined by identifying calls to specific destinations that enable credit transactions to be completed online.

By looking for IMEIs that make many calls to unique numbers all of which are located in a unique foreign destination.

2) Revenue Share

This type of fraud arises from fraudulent use of telephone accounts, whether stolen telephone accounts or fraudulently-credited telephone accounts, where used to enable calls to premium-rate numbers as a means of obtaining money.

Revenue Share fraud may be detected through access to Called Numbers and at least one of the respective originating user's International Mobile Subscriber Identifier (IMSI) and International Mobile Equipment Identifier (IMEI).

In a preferred embodiment, the above parameters may be used to identify revenue share fraud by looking for Handset identifiers (IMEIs) or IMSIs that make many, particularly long or multiple concurrent calls to premium rate numbers. In addition, capture of text message content by the probes 5, 20, 30, 40 may support the identification of fraudulent use of premium rate messaging services.

3) Credit Card Fraud

In this type of fraud, credit levels associated with fraudulently or legitimately obtained SIMs are topped up using stolen credit card details.

In order to detect such activity and the originator of it, access is required to Called number and IMEI data. Capture of dual-tone multi-frequency (DTMF) signals by the probes 5, 20, 30, 40 also enables specific credit or debit card account details to be identified when such signals are used to enter account numbers. Captured account details may be checked against records of accounts known to have been compromised to identify fraudulent use in action. However, in order to actually stop such activity, access to the IMSI would be required.

In a preferred embodiment, the above parameters may be used to identify credit card fraud by identifying IMEIs that become associated with multiple IMSIs solely for the purpose of purchasing credit. Such transactions are identifiable for example by recognising calls to particular destinations that have been provided by the mobile operator to enable credit top-up by means of a voice call or through an online transaction.

4) SMS spam

SMS spam arises when unsolicited and potentially illegal Short Message Service (SMS) messages are sent in bulk to target devices, within or outside a particular mobile telephony network.

In order to detect such activity, access would be required to at least an Originating Address and Message Content of each SMS message so that message content may be compared between messages being sent by a particular originating subscriber. Further access to Destination Address enables a pattern of targeting to be identified, not only to support the detection of an originator of spam messaging, but also to enable preventative measures to be taken to limit the potential impact on the network and other target networks.

5) Account Hi-Jack

This type of fraud arises when the security of a mobile subscriber's account is breached and a fraudster is able to gain access to the account.

In order to detect such activity, access would be required to at least IMEI and IMSI data. Usefully, such data may be correlated with call history information should that be available from another source.

6) Malware

The presence of malware executing on a mobile communications device may be inferred from a number of particular behaviours. For example the placing of calls to particular premium-rate numbers or other destination numbers known to be used in support of fraudulent activity, referenced in a maintained database of such numbers, may be indicative of the presence of malware. Alternatively, receipt of messages from certain known fraudulent originating numbers may also be indicative of malware operating on the mobile device, particularly where the recipient pays the fees associated with such calls. Capture of text message and data session content by the probes 5, 20, 30, 40 may also support the detection of malware, enabling certain characteristic content in such messages to be detected through analysis by the processing device.

The deployment of passive IP probes of the present invention enable passive observation of a telecommunications network for the purpose of detecting and reporting fraudulent behaviour. However, in preferred embodiments, the present invention may incorporate one of a number of counter-measures to prevent fraud. For example, the deployed IP probe devices 5, 20, 30, 40 may further comprise means for interacting with the telecommunications network to prevent fraud, for example by: (a) injecting signalling messages into the telecommunications network; or (b) communicating with a device such as that hosting the Home Location Register (HLR) for a network (not shown in FIG. 1) in order for the network operator to deny service to an identified fraudster from that network.

Whereas preferred embodiments of the present invention have been described in the context of a GPRS network and the data types conveyed over the interfaces typically found in such networks, the principles described may be applied without difficulty to other types of mobile communications network, in particular to any network using internet protocol (IP)-based transport for its signalling. For example, the present invention may be modified for use in more recently developed mobile network architectures that include the so-called "4G" LTE network architecture in which data may be captured by network probes monitoring the S1 interfaces in such a network.

The invention claimed is:

1. A mobile communications fraud detection system, comprising one or more probe devices arranged to intercept data of a plurality of predetermined types being carried over interfaces between equipment in a mobile communications network providing an air interface with subscriber mobile communications devices and equipment interfacing with core switching equipment of the mobile network, said plurality of probe devices being arranged to extract dual-tone multi-frequency signalling tones being communicated from or to a user of the mobile network and a processor arranged to receive predetermined types of data intercepted by said plurality of probe devices and to determine the presence of at least one predetermined type of fraudulent activity by users of the mobile network substantially at the time it occurs.

2. The fraud detection system according to claim 1, wherein said plurality of probe devices are arranged to intercept data types indicative of one or more of:
   (i) originating user's address or identity;
   (ii) destination address or identity;
   (iii) originating user's mobile equipment identity; and
   (iv) originating user's cell identity.

3. The fraud detection system according to claim 1, wherein said plurality of probe devices are arranged to extract content of text messages or content of data sessions being communicated from or to a user of the mobile network.

4. The fraud detection system according to claim 1, wherein said processor is arranged with access to data indicative of destination identities potentially associated with fraudulent activity.

5. The fraud detection system according to claim 1, wherein said processor is arranged with access to records of previous call activity by subscribers of the mobile network.

6. The fraud detection system according to claim 1, arranged to detect from an analysis of said intercepted data of a plurality of predetermined types one or more types of potentially fraudulent activity selected from gateway fraud, revenue share fraud, credit or debit card fraud, spam generation and fraudulent or other activities indicative of the presence of malware executing on a mobile communications device.

7. The fraud detection system according to claim 1, wherein said one or more probe devices are arranged to carry out pre-processing of said intercepted data to anonimise or to encrypt certain predetermined types of sensitive data prior to communication outside of the probe device.

8. The fraud detection system according to claim 7, wherein said one or more probe devices are arranged to determine the presence of at least one predetermined type of fraudulent activity by users of the mobile network substantially at the time it occurs and to trigger a response to a determined presence of such activity without making said predetermined types of sensitive data generally available outside of the probe device.

9. The fraud detection system according to claim 1, wherein the mobile communications network is one which uses internet protocol (IP)-based transport for its signalling.

10. The fraud detection system according to claim 9, wherein the mobile communications network is a General Packet Radio Service (GPRS) network.

11. The fraud detection system according to claim 10, wherein said one or more probe devices are arranged to intercept data of said plurality of predetermined types being carried over interfaces selected from at least one of the A-interface, the Gb-interface, the lu-CS interface and the lu-PS interface in the GPRS network.

12. The fraud detection system according to claim 11, wherein said plurality of probe devices are arranged to intercept data types comprising at least one of:
- called number;
- originating user's International Mobile Subscriber Identifier (IMSI);
- originating user's Mobile Subscriber Integrated Digital Services Network Number (MSISDN);
- destination MSISDN;
- originating user's International Mobile Equipment Identifier (IMEI);
- cell identifier (Cell ID);
- originating address; and
- destination address.

13. A mobile communications fraud detection system, comprising one or more probe devices arranged to intercept data of a plurality of predetermined types being carried over interfaces between equipment in a mobile communications network providing an air interface with subscriber mobile communications devices and equipment interfacing with core switching equipment of the mobile network, said one or more probe devices being arranged to carry out pre-processing of said intercepted data to anonimise or to encrypt certain predetermined types of sensitive data prior to communication outside of the probe device and a processor arranged to receive predetermined types of data intercepted by said plurality of probe devices and to determine the presence of at least one predetermined type of fraudulent activity by users of the mobile network substantially at the time it occurs.

14. The fraud detection system according to claim 13, wherein said one or more probe devices are arranged to determine the presence of at least one predetermined type of fraudulent activity by users of the mobile network substantially at the time it occurs and to trigger a response to a determined presence of such activity without making said predetermined types of sensitive data generally available outside of the probe device.

* * * * *